US010183586B1

United States Patent
Appelbaum

(10) Patent No.: US 10,183,586 B1
(45) Date of Patent: Jan. 22, 2019

(54) MIXED-LEVEL ELECTRIC VEHICLE SUPPLY EQUIPMENT (EVSE) AND ASSOCIATED CHARGING METHODS FOR MULTI-TYPE ELECTRIC VEHICLES AND NON-ELECTRIC VEHICLE DEVICES

(71) Applicant: EVERCHARGE, INC., San Francisco, CA (US)

(72) Inventor: Jason Appelbaum, Emeryville, CA (US)

(73) Assignee: Evercharge, Inc., San Francisco, CA (US)

( * ) Notice: Subject to any disclaimer, the term of this patent is extended or adjusted under 35 U.S.C. 154(b) by 160 days.

(21) Appl. No.: 15/275,433

(22) Filed: Sep. 25, 2016

Related U.S. Application Data

(60) Provisional application No. 62/233,194, filed on Sep. 25, 2015.

(51) Int. Cl.
  *B60L 11/18* (2006.01)
  *B60L 1/00* (2006.01)

(52) U.S. Cl.
  CPC ............ *B60L 11/1846* (2013.01); *B60L 1/00* (2013.01); *B60L 11/1818* (2013.01); *B60L 2200/12* (2013.01); *B60L 2200/18* (2013.01); *B60L 2200/20* (2013.01); *B60L 2200/36* (2013.01)

(58) Field of Classification Search
  CPC ..... B60L 11/1846; B60L 1/00; B60L 11/1818
  See application file for complete search history.

(56) References Cited

U.S. PATENT DOCUMENTS

| 2013/0127416 | A1* | 5/2013 | Karner | G06Q 20/102 320/109 |
| 2013/0234664 | A1* | 9/2013 | Marus | B60L 3/0069 320/109 |
| 2016/0176306 | A1* | 6/2016 | Outwater | B60L 11/1825 320/138 |
| 2016/0198002 | A1* | 7/2016 | Penilla | H04W 4/003 709/228 |
| 2016/0359980 | A1* | 12/2016 | Penilla | H04W 4/003 |
| 2017/0028857 | A1* | 2/2017 | Gonzales | B60L 11/1809 |
| 2017/0197517 | A1* | 7/2017 | Jamieson | B60L 11/1816 |

* cited by examiner

*Primary Examiner* — Stacy Whitmore
(74) *Attorney, Agent, or Firm* — Renaissance IP Law Group, LLP; David A. Crowther

(57) ABSTRACT

Embodiments include a multi-level electric vehicle supply equipment (EVSE) unit. The multi-level EVSE unit can include a Level 2 charge handle, a receptacle configured to receive the Level 2 charge handle, and a Level 1 outlet including one or more plug outlets configured to receive one or more corresponding Level 1 plugs. The Level 2 charge handle can be permanently attached to the multi-level EVSE unit via a cable. The Level 1 outlet can temporarily receive the one or more corresponding Level 1 plugs. A first power meter associated with the Level 2 charge handle can meter power delivered via the Level 2 charge handle. A second power meter associated with the Level 1 outlet can meter power delivered via the Level 1 outlet. A charging logic and relay section can intelligently allocate power between the Level 2 handle and the Level 1 outlet according to charging rules.

14 Claims, 13 Drawing Sheets

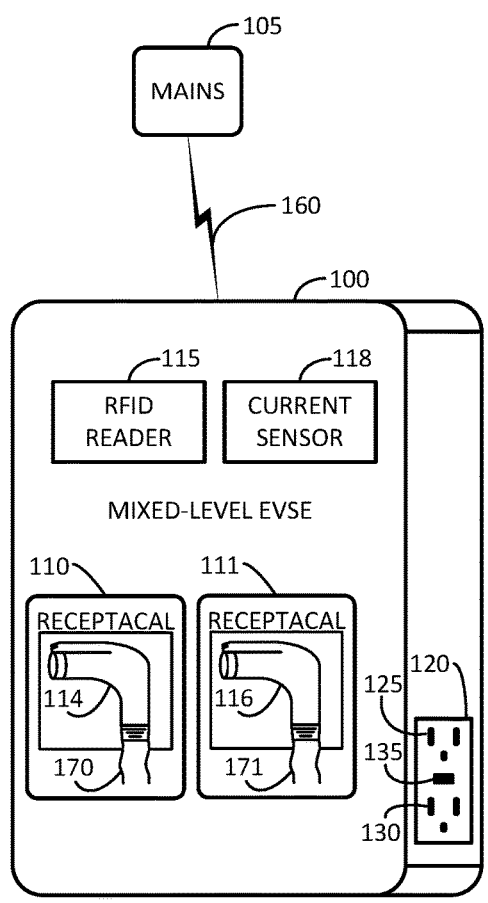
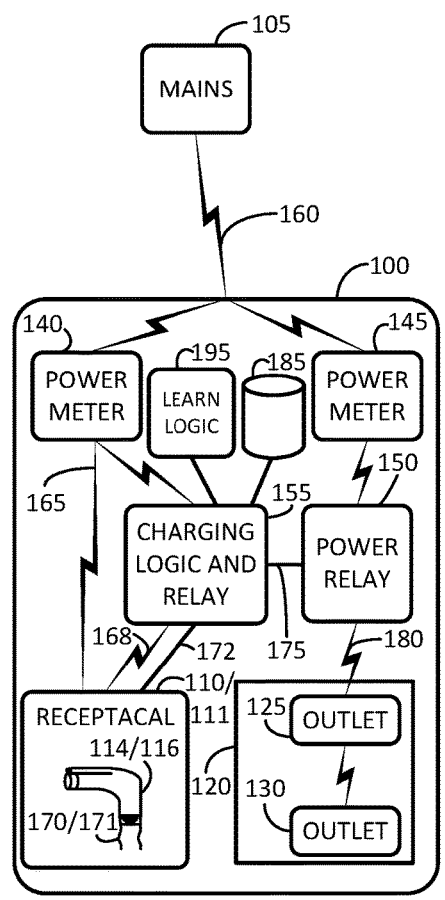
FIG. 1E
FIG. 1F

MIXED-LEVEL ELECTRIC VEHICLE SUPPLY EQUIPMENT (EVSE) AND ASSOCIATED CHARGING METHODS FOR MULTI-TYPE ELECTRIC VEHICLES AND NON-ELECTRIC VEHICLE DEVICES

RELATED APPLICATION DATA

This application claims the benefit of U.S. Provisional Patent Application No. 62/233,194, filed on Sep. 25, 2015, the contents of which are hereby incorporated by reference.

FIELD

This disclosure relates to electric vehicle supply equipment, and, more particularly, to mixed-level electric vehicle supply equipment (EVSE) and associated charging methods for multi-type electric vehicles and non-electric vehicle devices.

BACKGROUND

The adoption of electric vehicles, plug-in hybrid electric vehicles, and the like, continues at a rapid pace. As the deployment of electric vehicles increases, the charging infrastructure must be adapted to meet demand Conventional electric vehicle supply equipment (EVSE) units are categorized as either Level 1 or Level 2. Level 1 EVSE units provide a 120 Volt (V) single phase outlet with a peak current of about 16 Amps (A). Alternatively, Level 2 EVSE units provide a 240 V split phase outlet with a peak current of up to about 80 A, and which provides a faster charge. But the physical charging components of the Level 2 EVSE unit are only compatible with a narrow subset of electric vehicles. Electric vehicle owners are forced to choose between a faster charging, but less versatile Level 2 unit, or slower charging but more versatile Level 1 unit. Moreover, neither category of EVSE units provides significant intelligent charging capabilities.

Accordingly, a need remains for improved methods and systems for efficiently and intelligently distributing energy to electric vehicles and non-electric vehicle devices. Embodiments of the invention address these and other limitations in the prior art.

BRIEF DESCRIPTION OF THE DRAWINGS

FIG. 1E illustrates an example block diagram of a mixed-level EVSE unit in accordance with various embodiments of the present invention.

FIG. 1F illustrates an example block diagram of internal details of the mixed-level EVSE unit of FIG. 1E.

The foregoing and other features of the invention will become more readily apparent from the following detailed description, which proceeds with reference to the accompanying drawings.

DETAILED DESCRIPTION OF THE EMBODIMENTS

Reference will now be made in detail to embodiments of the inventive concept, examples of which are illustrated in the accompanying drawings. The accompanying drawings are not necessarily drawn to scale. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first electric vehicle could be termed a second electric vehicle, and, similarly, a second electric vehicle could be termed a first electric vehicle, without departing from the scope of the inventive concept.

Like numbers refer to like elements throughout. The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Reference is often made herein to "electric vehicles." It will be understood that such vehicles can include plug-in hybrid vehicles, pure electric vehicles, an electric golf cart, an electric bike, an electric scooter, an electric skateboard, a SEGWAY®, or any one of a variety of vehicles that operate or move using at least some electricity. The term "control signal" as referred to herein can be a "pilot signal," or other suitable control signal. The term "pilot signal" as referred to herein can be a low voltage connection that is used to control a level of current draw that the electric vehicle requests or is allowed to request.

Figure 1A:
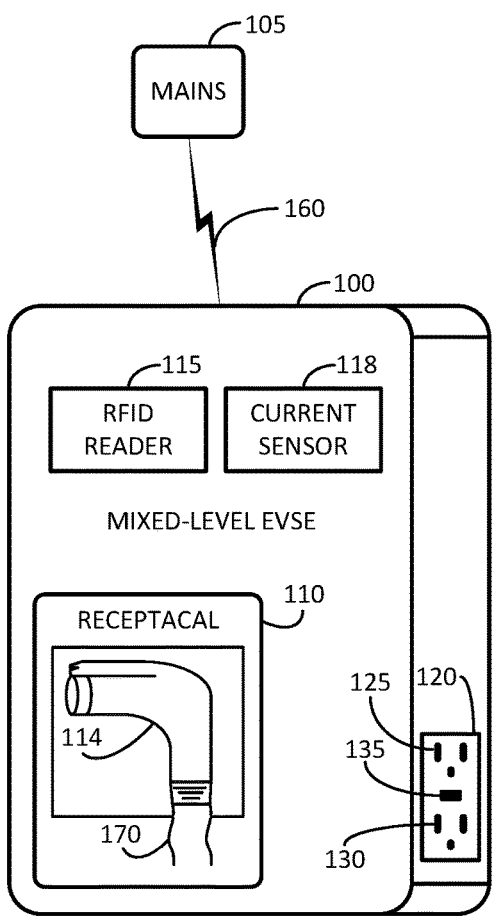
FIG. 1A illustrates an example block diagram of a mixed-level EVSE unit in accordance with various embodiments of the present invention.

FIG. 1A illustrates an example block diagram of a mixed-level EVSE unit 100 in accordance with various embodiments of the present invention. The mixed-level EVSE unit 100 can include components and capabilities of both a Level 1 EVSE unit and a Level 2 EVSE unit. For example, the mixed-level EVSE unit 100 can include a Level 2 charge handle 114 and a Level 1 outlet 120. In some embodiments, the charge handle is a Level 3 handle. While reference herein is generally made to a Level 2 charge handle 114, each instance of such reference can be replaced with a Level 3 charge handle without departing from the inventive concepts disclosed herein. The Level 2 charge handle 114 can conform to the J1772 standard or other suitable standard. Similarly, the Level 1 outlet 120 can conform to the J1772 standard or other suitable standard. The Level 1 outlet 120 can include one or more plug outlets (e.g., 125 and 130).

The one or more plug outlets (e.g., 125 and 130) can be National Electrical Manufacturers Association (NEMA) 5-15 plug outlets, although it will be understood that other types of plug outlets can be used, depending for example on the various geographically distinct standards used around the world. The Level 1 outlet 120 can include a ground fault interrupter 135. The mixed-level EVSE unit 100 can be coupled to and/or powered by mains 105 via power line 160. The Level 2 charge handle 114 can be coupled to the mixed-level EVSE unit 100 via a cable 170. For example, the cable 170 can be coupled to power line 165, power line 168, and/or communication line 172. A receptacle 110 can receive the Level 2 charge handle 114 when not in use. The mixed-level EVSE unit 100 can include a radio frequency identification (RFID) reader 115 and one or more current sensors 118, as further described below.

Figure 1B:
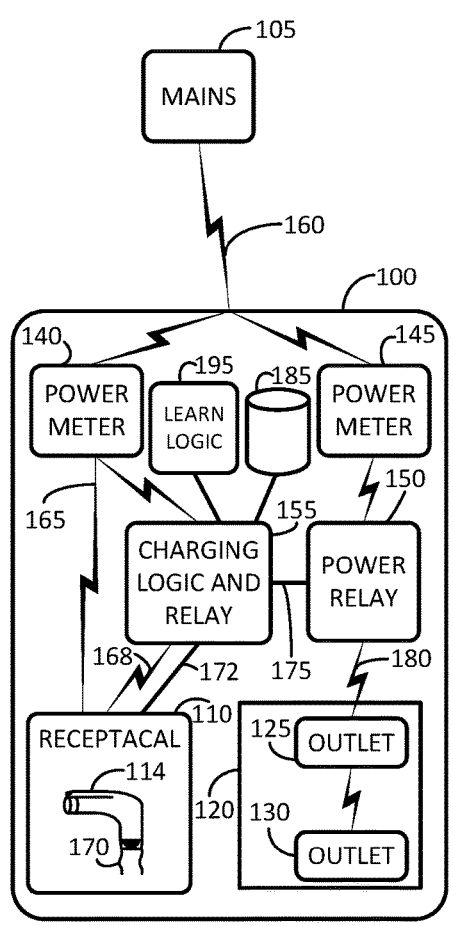
FIG. 1B illustrates an example block diagram of internal details of the mixed-level EVSE unit of FIG. 1A.

FIG. 1B illustrates an example block diagram of some internal details of the mixed-level EVSE unit 100 of FIG. 1A. The mixed-level EVSE unit 100 can include a power meter 140 associated with the Level 2 charge handle 114 and a power meter 145 associated with the Level 1 outlet 120. The power meter 140 can be disposed between the mains 105 and the charge handle 114. The power meter 145 can be disposed between the mains 105 and the outlet 120. The power meter 140 can meter power delivered via the Level 2 charge handle 114. The power meter 145 can meter power delivered via the Level 1 outlet 120.

The power meter 140 can be electrically coupled directly to the charge handle 114 via the power line 165. Alternatively or in addition, the power meter 140 can be electrically coupled to a charging logic and relay section 155, which can be electrically coupled to the charge handle 114 via the power line 168. The charging logic and relay section 155 can be communicatively coupled to the charge handle 114 via the communication line 172. The charging logic and relay section 155 can enable and/or disable charging through the Level 2 handle 114 according to a set of heuristics, charging rules, situational information, or any combination thereof. The charging logic and relay section 155 can be power-managed, and execute power management commands, in accordance with embodiments described herein, and as further set forth in detail below.

The charging logic and relay section 155 can be coupled to a local storage device 185, which can store operation information such as change events, as described in further detail below. The storage device 185 can include a volatile memory such random access memory (RAM), a non-volatile memory such as flash memory, a hard disk drive, or the like. The mixed-level EVSE unit 100 can include a learning logic section 195, which can be coupled to the charging logic and relay section 155, and is further described in detail below.

The power meter 145 can be electrically coupled to the power relay section 150, which can be electrically coupled to the outlet 120 via power line 180. The power relay section 150 can be communicatively coupled to the charging logic and relay section 155 via communication line 175. One or more control signals can be transmitted between the charging logic and relay section 155 and the power relay section 150 via the communication line 175 to control the power relay section 150. The power relay section 150 can enable and/or disable charging through the Level 1 outlet 120 according to a set of heuristics, charging rules, situational information, or any combination thereof, as further described below. For example, the charging logic and relay section 155 via the communication line 175 can cause the power relay section 150 to enable and/or disable charging through the Level 1 outlet 120 according to the set of heuristics, charging rules, situational information, or any combination thereof, as further described below.

Figure 1C:
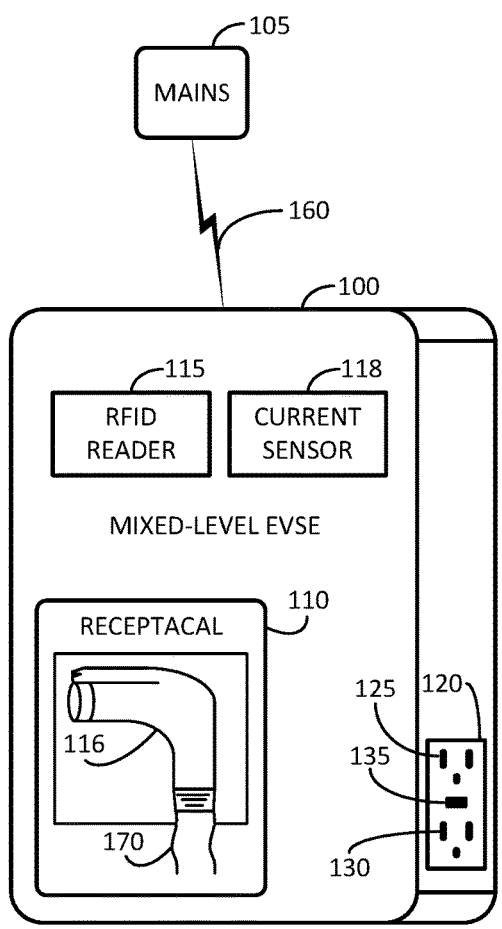
FIG. 1C illustrates an example block diagram of a mixed-level EVSE unit in accordance with various embodiments of the present invention.
Figure 1D:
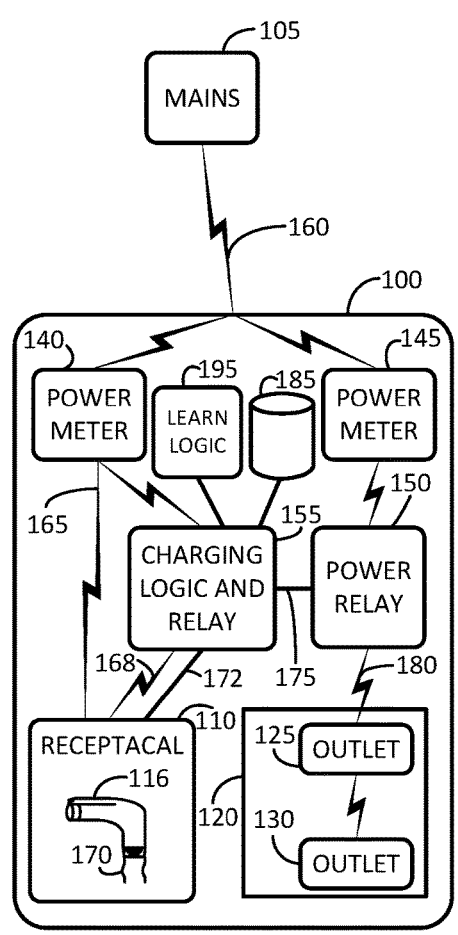
FIG. 1D illustrates an example block diagram of internal details of the mixed-level EVSE unit of FIG. 1C.

FIG. 1C illustrates an example block diagram of a mixed-level EVSE unit 100 in accordance with various embodiments of the present invention. FIG. 1D illustrates an example block diagram of internal details of the mixed-level EVSE unit 100 of FIG. 1C. Reference is now made to FIGS. 1C and 1D.

Some of the components of the mixed-level EVSE unit 100 are discussed in detail above and below, and therefore, a detailed description of such components is not necessarily repeated. The primary difference in FIGS. 1C and 1D as compared to FIGS. 1A and 1B is that the charge handle is a Level 3 charge handle 116 rather than a Level 2 charge handle 114. The Level 3 charge handle 114 can conform to the J1772 standard or other suitable standard. The functions described herein apply to the Level 3 charge handle 116 in similar fashion to the Level 2 charge handle 114.

FIG. 1E illustrates an example block diagram of a mixed-level EVSE unit in accordance with various embodiments of the present invention. FIG. 1F illustrates an example block diagram of internal details of the mixed-level EVSE unit of FIG. 1E. Reference is now made to FIGS. 1E and 1F.

Some of the components of the mixed-level EVSE unit 100 are discussed in detail above and below, and therefore, a detailed description of such components is not necessarily repeated. The primary difference in FIGS. 1E and 1F as compared to FIGS. 1A and 1B is the inclusion of a Level 3 charge handle 116, in addition to the Level 2 charge handle 114 and the Level 1 outlet 120. The Level 3 charge handle 114 can conform to the J1772 standard or other suitable standard. The functions described herein apply to the Level 3 charge handle 116 in similar fashion to the Level 2 charge handle 114. Accordingly, the mixed-level EVSE unit 100 can include a Level 1 outlet 120, a Level 2 charge handle 114, and a Level 3 charge handle 116, all within the same EVSE unit 100. While only two power meters (e.g., 140 and 145) are shown, it will be understood that third power meter can be included, so that the Level 3 charge handle has its own meter associated therewith. A receptacle 111 can receive the Level 3 charge handle 116 when not in use. The Level 3 charge handle 116 can be coupled to the mixed-level EVSE unit 100 via a cable 171. For example, the cable 171 can be coupled to power line 165, power line 168, and/or communication line 172.

Figure 2A:
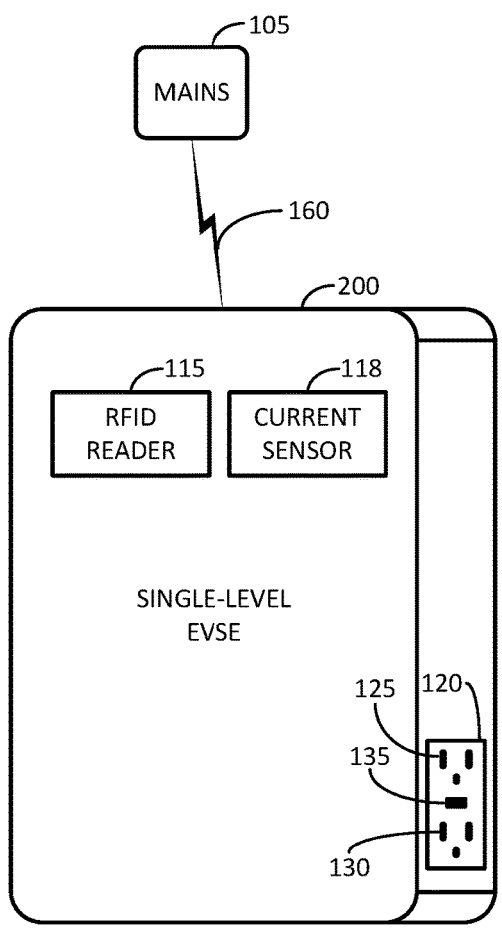
FIG. 2A illustrates an example block diagram of a single-level EVSE unit in accordance with various embodiments of the present invention.

FIG. 2A illustrates an example block diagram of a single-level EVSE unit 200 in accordance with various embodiments of the present invention. The single-level EVSE unit 200 can include a Level 1 outlet 120, which can conform, for example, to the J1772 standard or other suitable standard. The Level 1 outlet 120 can include one or more plug outlets (e.g., 125 and 130).

The one or more plug outlets (e.g., 125 and 130) can be National Electrical Manufacturers Association (NEMA) 5-15 plug outlets, although it will be understood that other types of plug outlets can be used, depending for example on the various geographically distinct standards used around the world. The Level 1 outlet 120 can include a ground fault interrupter 135. The single-level EVSE unit 200 can be coupled to and/or powered by mains 105 via power line 160. The single-level EVSE unit 200 can include a radio frequency identification (RFID) reader 115 and one or more current sensors 118, as further described below.

Figure 2B:
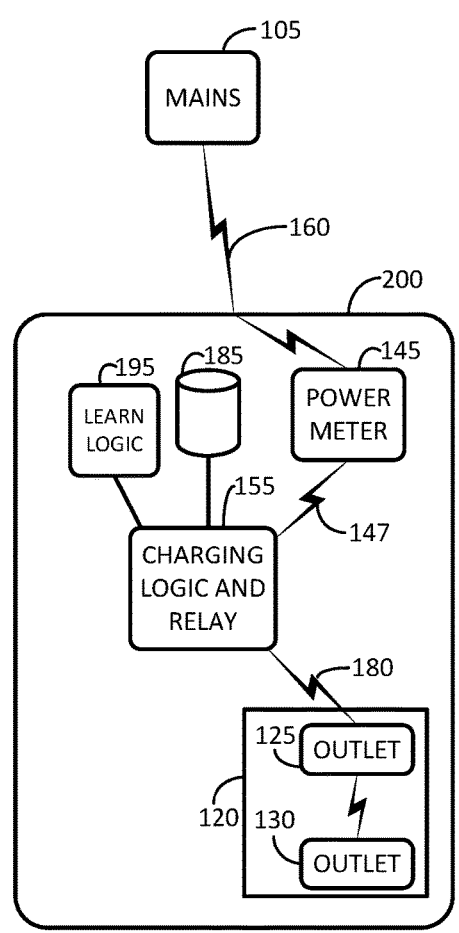
FIG. 2B illustrates an example block diagram of internal details of the single-level EVSE unit of FIG. 2A.

FIG. 2B illustrates an example block diagram of some internal details of the single-level EVSE unit 200 of FIG. 2A. The single-level EVSE unit 200 can include a power meter 145 associated with the Level 1 outlet 120. The power meter 145 can be disposed between the mains 105 and the outlet 120. The power meter 145 can meter power delivered via the Level 1 outlet 120.

The power meter 145 can be electrically coupled to a charging logic and relay section 155 via line 147, which can be electrically coupled to the outlet 120 via power line 180. The charging logic and relay section 155 can enable and/or disable charging through the Level 1 outlet 120 according to a set of heuristics, charging rules, situational information, or any combination thereof. The charging logic and relay section 155 can be power-managed in accordance with embodiments described herein, and as further set forth in detail below.

The charging logic and relay section 155 can be coupled to a local storage device 185, which can store operation information such as change events, as described in further detail below. The storage device 185 can include a volatile memory such random access memory (RAM), a non-volatile memory such as flash memory, a hard disk drive, or the like. The single-level EVSE unit 200 can include a learning logic section 195, which can be coupled to the charging logic and relay section 155, and is further described in detail below.

Figure 3A:
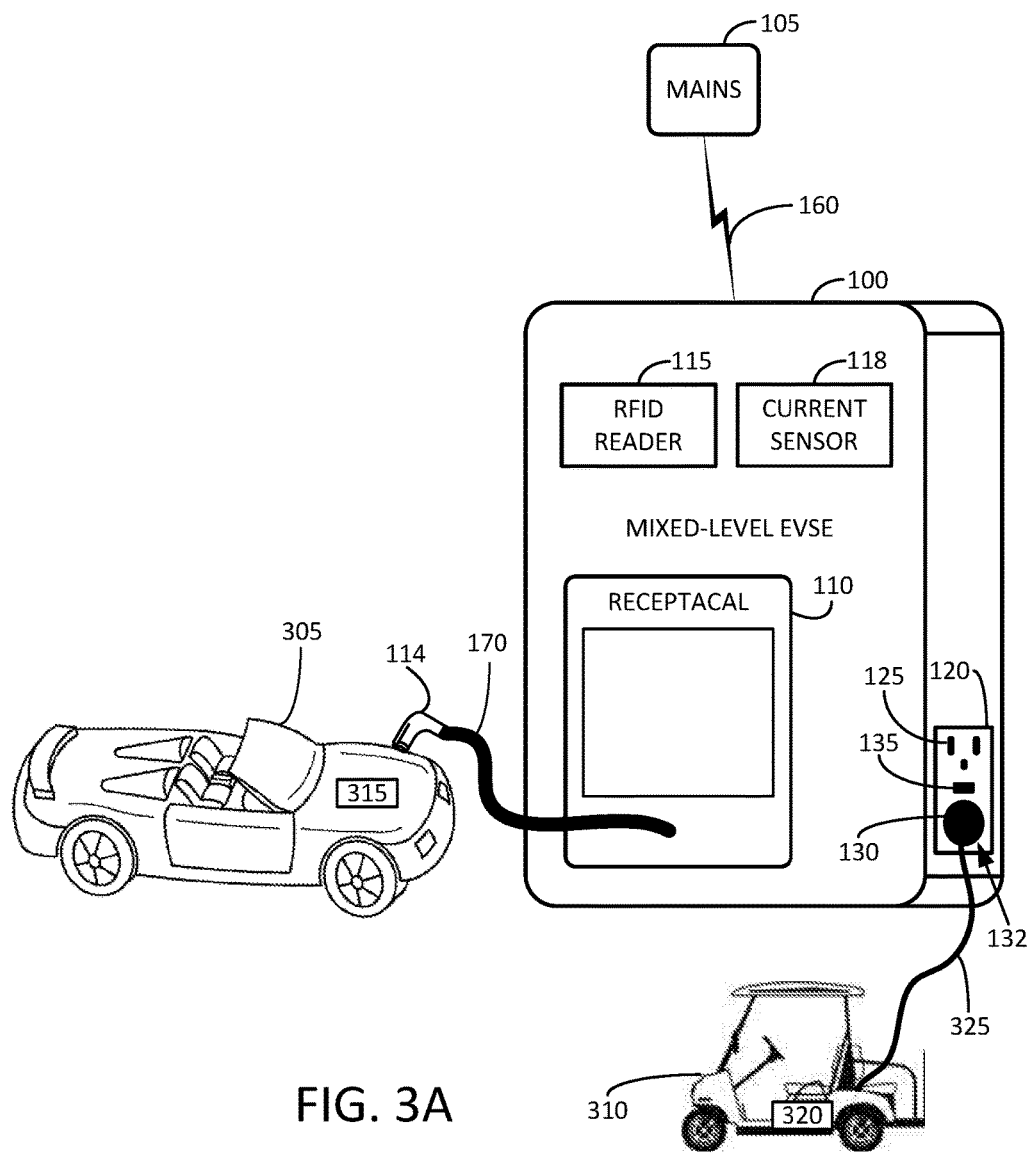
FIG. 3A illustrates an example block diagram of the mixed-level EVSE unit of FIGS. 1A and 1B attached to an electric vehicle using a first type of charge handle and to a golf cart using a second type of outlet in accordance with various embodiments of the present invention.

FIG. 3A illustrates an example block diagram of the mixed-level EVSE unit 100 of FIGS. 1A and 1B attached to an electric vehicle 305 using a first type of charge handle 114 and cable 170, and to a golf cart 310 using a second type of outlet 120 and cable 325 in accordance with various embodiments of the present invention. The outlet 120 can receive a plug (e.g., 132) attached to the cable 325. The mixed-level EVSE unit 100 can simultaneously charge the electric car 305 and the golf cart 310 according to a set of heuristics, charging rules, situational information, or any combination thereof, as further described below.

The RFID reader 115 can detect information from RFID tag 315 about the electric car 305. In addition, the RFID reader 115 can detect information from RFID tag 320 about the golf cart 310. The charging logic and relay section 155 (of FIGS. 1B and 2B) can make charging determinations based at least on the detected information. It will be understood that other kinds of electric vehicles such as an electric scooter, an electric skateboard, a SEGWAY®, or the like, that uses a Level 1 outlet such as outlet 120, can be simultaneously charged with the electric vehicle 305, which uses a Level 2 charge handle 114. It will be understood that two or more Level 1 plug outlets (e.g., 125 and 130) can be used to charge two or more corresponding electric vehicles that use a Level 1 outlet such as outlet 120 simultaneously with the electric vehicle 305, which uses a Level 2 charge handle 114.

Figure 3B:
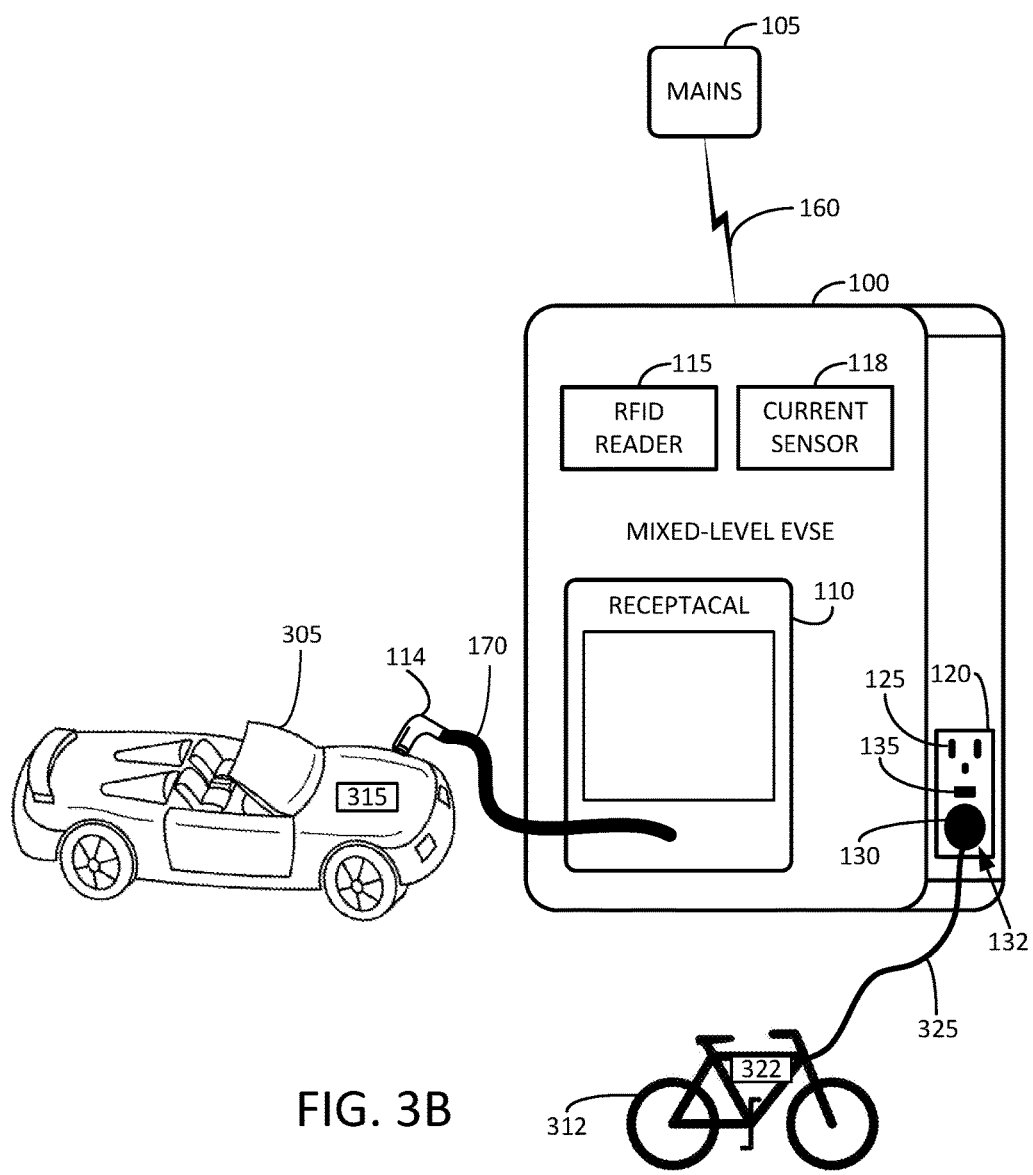
FIG. 3B illustrates an example block diagram of the mixed-level EVSE unit of FIGS. 1A and 1B attached to an electric vehicle using a first type of charge handle and to an electric bike using a second type of outlet in accordance with various embodiments of the present invention.

FIG. 3B illustrates an example block diagram of the mixed-level EVSE unit 100 of FIGS. 1A and 1B attached to an electric vehicle 305 using a first type of charge handle 114 and cable 170, and to an electric bike 312 using a second type of outlet 120 and cable 325 in accordance with various embodiments of the present invention. The outlet 120 can receive a plug (e.g., 132) attached to the cable 325 having the second type. The mixed-level EVSE unit 100 can simultaneously charge the electric car 305 and the electric bike 312 according to a set of heuristics, charging rules, situational information, or any combination thereof, as further described below.

The RFID reader 115 can detect information from RFID tag 315 about the electric car 305. In addition, the RFID reader 115 can detect information from RFID tag 322 about the electric bike 312. The charging logic and relay section 155 (of FIGS. 1B and 2B) can make charging determinations based at least on the detected information. It will be understood that two or more Level 1 plug outlets (e.g., 125 and 130) can be used to charge two or more corresponding electric vehicles that use a Level 1 outlet such as outlet 120 simultaneously with the electric vehicle 305, which uses a Level 2 charge handle 114.

Figure 3C:
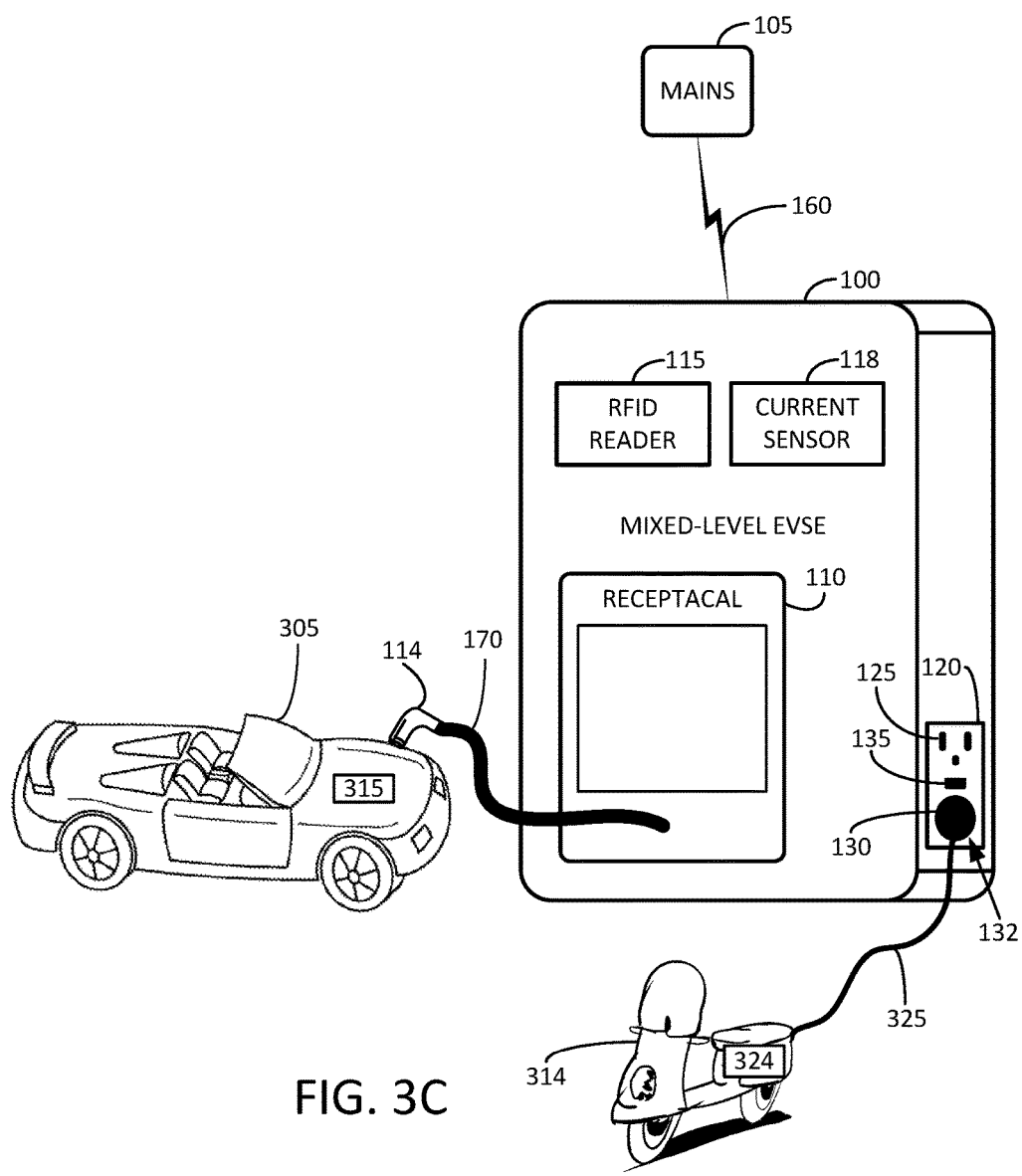
FIG. 3C illustrates an example block diagram of the mixed-level EVSE unit of FIGS. 1A and 1B attached to an electric vehicle using a first type of charge handle and to an electric scooter using a second type of outlet in accordance with various embodiments of the present invention.

FIG. 3C illustrates an example block diagram of the mixed-level EVSE unit 100 of FIGS. 1A and 1B attached to an electric vehicle 305 using a first type of charge handle 114 and cable 170, and to an electric scooter 314 using a second type of outlet 120 and cable 325 in accordance with various embodiments of the present invention. The outlet 120 can receive a plug (e.g., 132) attached to the cable 325 having the second type. The mixed-level EVSE unit 100 can simultaneously charge the electric car 305 and the electric scooter 314 according to a set of heuristics, charging rules, situational information, or any combination thereof, as further described below.

The RFID reader 115 can detect information from RFID tag 315 about the electric car 305. In addition, the RFID reader 115 can detect information from RFID tag 324 about the electric scooter 314. The charging logic and relay section 155 (of FIGS. 1B and 2B) can make charging determinations based at least on the detected information. It will be understood that two or more Level 1 plug outlets (e.g., 125 and 130) can be used to charge two or more corresponding electric vehicles that use a Level 1 outlet such as outlet 120 simultaneously with the electric vehicle 305, which uses a Level 2 charge handle 114.

Figure 3D:
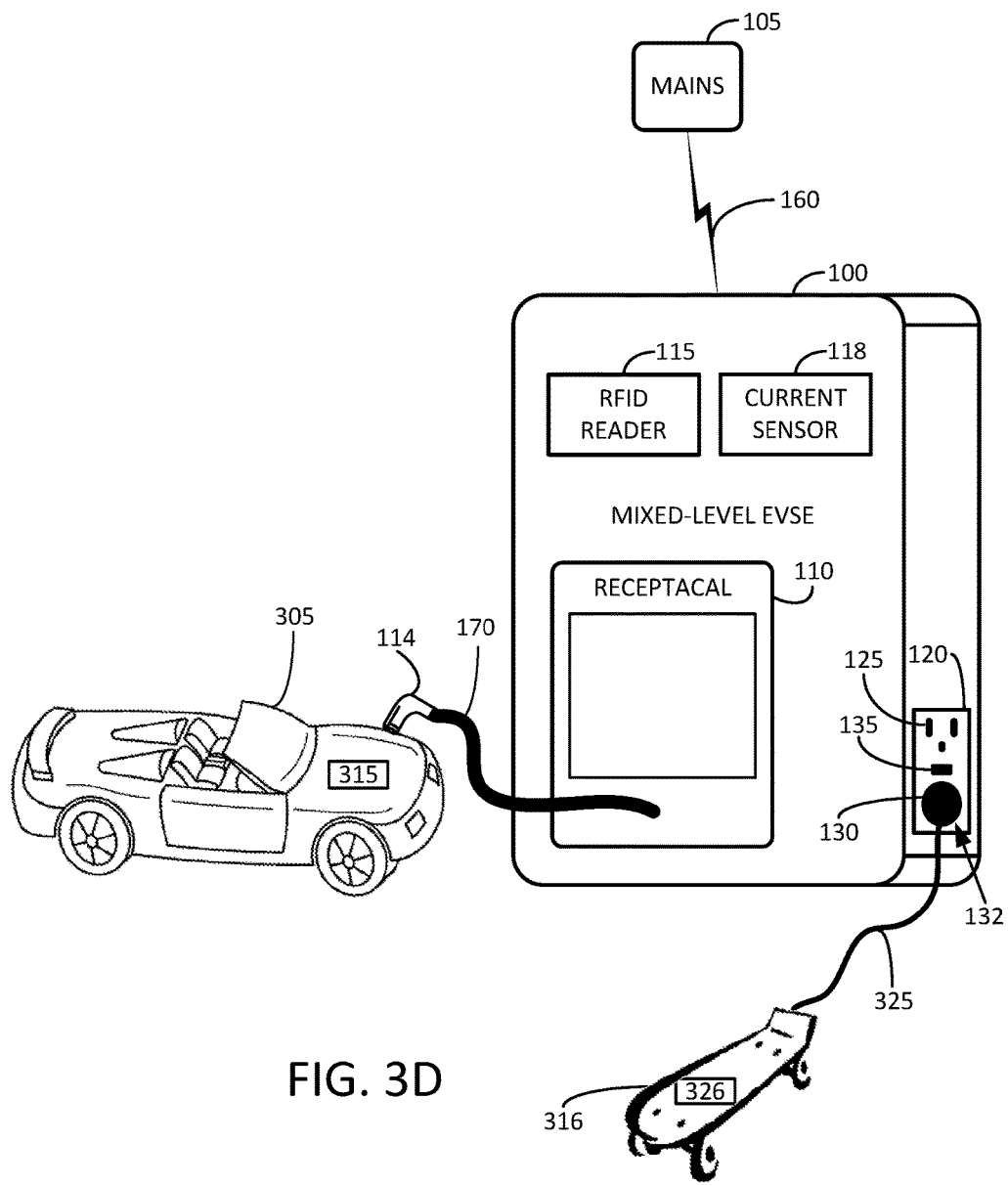
FIG. 3D illustrates an example block diagram of the mixed-level EVSE unit of FIGS. 1A and 1B attached to an electric vehicle using a first type of charge handle and cable, and to an electric skateboard using a second type of outlet and cable in accordance with various embodiments of the present invention.

FIG. 3D illustrates an example block diagram of the mixed-level EVSE unit 100 of FIGS. 1A and 1B attached to an electric vehicle 305 using a first type of charge handle 114 and cable 170, and to an electric skateboard 316 using a second type of outlet 120 and cable 325 in accordance with various embodiments of the present invention. The outlet 120 can receive a plug (e.g., 132) attached to the cable 325 having the second type. The mixed-level EVSE unit 100 can simultaneously charge the electric car 305 and the electric skateboard 316 according to a set of heuristics, charging rules, situational information, or any combination thereof, as further described below.

The RFID reader 115 can detect information from RFID tag 315 about the electric car 305. In addition, the RFID reader 115 can detect information from RFID tag 326 about the electric skateboard 316. The charging logic and relay section 155 (of FIGS. 1B and 2B) can make charging determinations based at least on the detected information. It will be understood that two or more Level 1 plug outlets (e.g., 125 and 130) can be used to charge two or more corresponding electric vehicles that use a Level 1 outlet such as outlet 120 simultaneously with the electric vehicle 305, which uses a Level 2 charge handle 114.

Figure 3E:
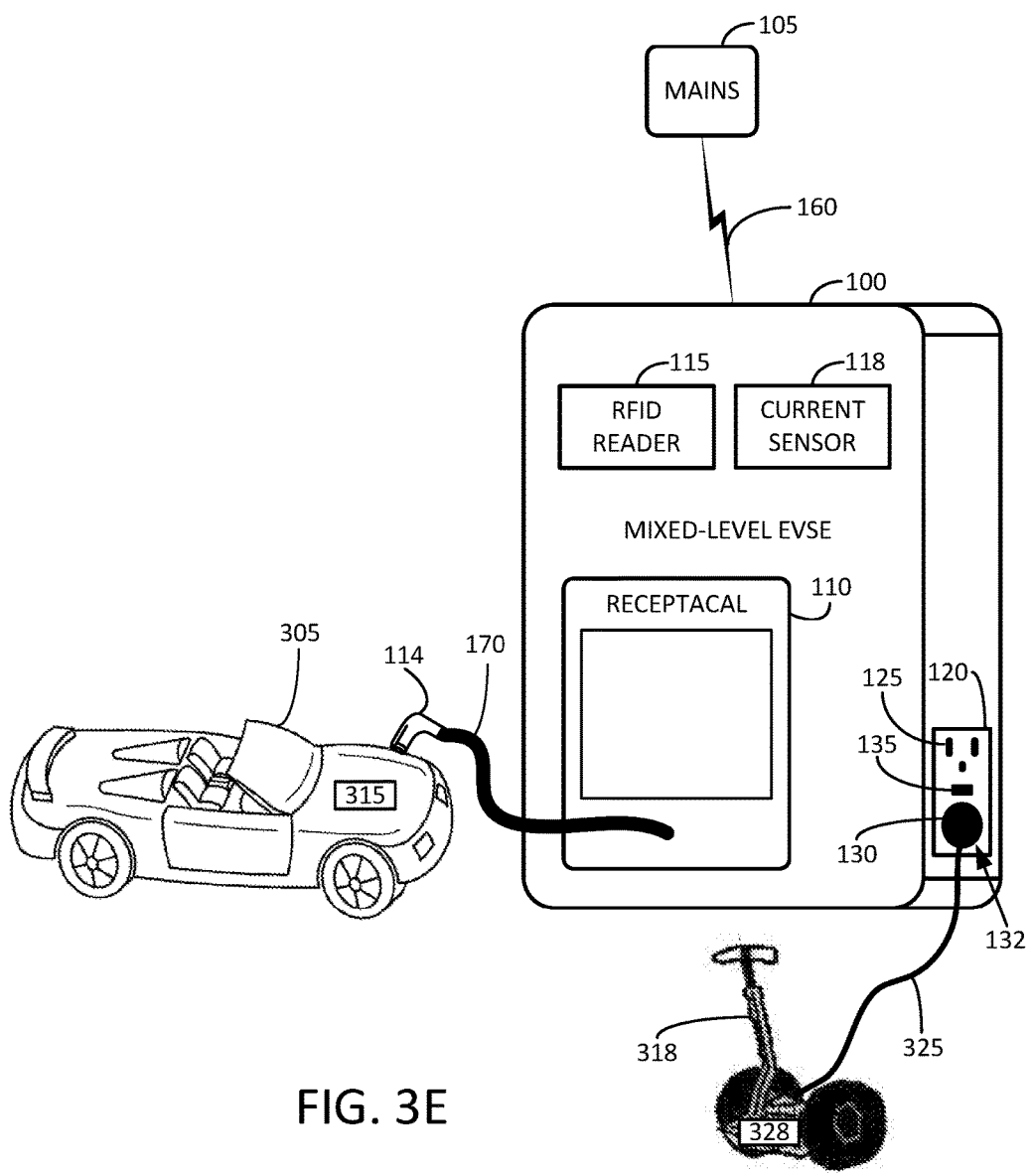
FIG. 3E illustrates an example block diagram of the mixed-level EVSE unit of FIGS. 1A and 1B attached to an electric vehicle using a first type of charge handle and cable, and to an upright human transportation vehicle using a second type of outlet and cable in accordance with various embodiments of the present invention.

FIG. 3E illustrates an example block diagram of the mixed-level EVSE unit 100 of FIGS. 1A and 1B attached to an electric vehicle 305 using a first type of charge handle 114 and cable 170, and to an upright human transportation vehicle 318, such as a SEGWAY®, using a second type of outlet 120 and cable 325 in accordance with various embodiments of the present invention. The outlet 120 can receive a plug (e.g., 132) attached to the cable 325 having the second type. The mixed-level EVSE unit 100 can simultaneously charge the electric car 305 and the upright human transportation vehicle 318 according to a set of heuristics, charging rules, situational information, or any combination thereof, as further described below.

The RFID reader 115 can detect information from RFID tag 315 about the electric car 305. In addition, the RFID reader 115 can detect information from RFID tag 328 about the upright human transportation vehicle 318. The charging logic and relay section 155 (of FIGS. 1B and 2B) can make charging determinations based at least on the detected information. It will be understood that two or more Level 1 plug outlets (e.g., 125 and 130) can be used to charge two or more corresponding electric vehicles that use a Level 1 outlet such as outlet 120 simultaneously with the electric vehicle 305, which uses a Level 2 charge handle 114.

Figure 4:
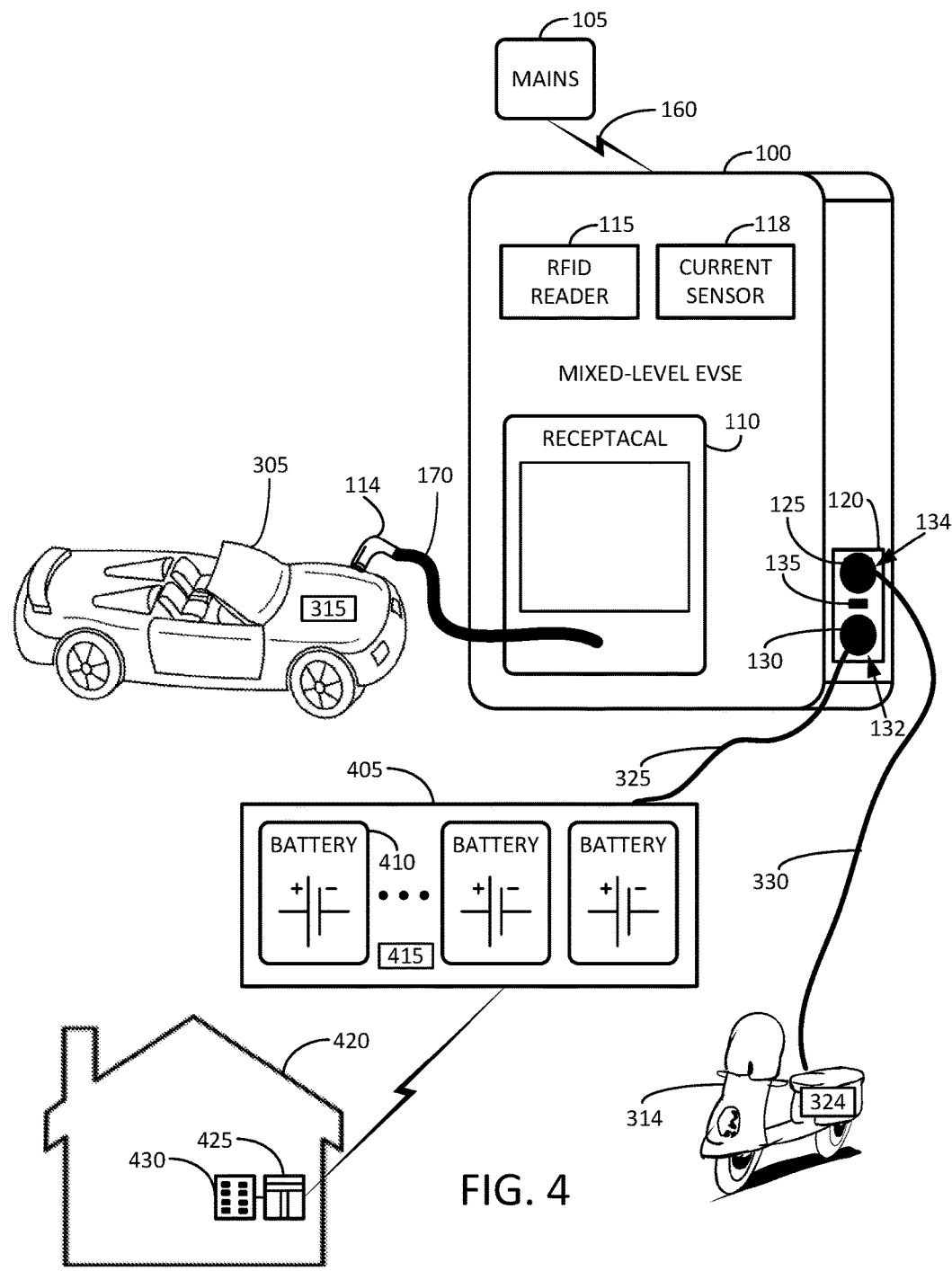
FIG. 4 illustrates an example block diagram of the mixed-level EVSE unit of FIGS. 1A and 1B attached to an electric vehicle using a first type of outlet and to a battery bank using a second type of outlet in accordance with various embodiments of the present invention.

FIG. 4 illustrates an example block diagram of the mixed-level EVSE unit 100 of FIGS. 1A and 1B attached to an electric vehicle 305 using a first type of charge handle 114 and cable 170, and to a battery bank 405 using a second type of outlet 120 and cable 325 in accordance with various embodiments of the present invention. The outlet 120 can receive a plug (e.g., 132) attached to the cable 325 having the second type. The outlet 120 can receive a plug (e.g., 134) attached to the cable 330 having the second type. The mixed-level EVSE unit 100 can simultaneously charge the electric car 305 and one or more batteries 410 of the battery bank 405 according to a set of heuristics, charging rules, situational information, or any combination thereof as further described below.

The RFID reader 115 can detect information from RFID tag 315 about the electric car 305. In addition, the RFID reader 115 can detect information from RFID tag 415 about the battery bank 405. The charging logic and relay section 155 (of FIGS. 1B and 2B) can make charging determinations based at least on the detected information. The battery bank 405 can include one or more lithium ion batteries 410. It will be understood that any suitable kind of batteries can be used in the battery bank 405. The battery bank 405 can be used, for example, to store energy for a home 420. The battery bank 405 can be used, for example, to shift charging times to off-peak times and rates. For example, the charging logic and relay section 155 (of FIGS. 1B and 2B) can make a charging determination that the battery bank 405 should be charged within a predefined period of time, for example, from 10 pm at night to 5 am in the morning. In this fashion, the batter bank 405 can be charged when electricity rates are relatively lower than prevailing rates during peak times.

In some embodiments, the battery bank 405 can be wall-mounted. For example, the batter bank 405 can be wall-mounted in a garage of the home 420. In some embodiments, an electrical inverter 425 can be disposed between the battery bank 405 and an electric panel or circuit breaker 430 of the home.

In addition to the electric vehicle 305 and the battery bank 405, a third device such as the electric scooter 314 that uses a Level 1 outlet such as outlet 120 can be simultaneously charged via the plug outlet 125 and cable 330. It will be understood that the golf cart 310 (of FIG. 3A), the electric bike 312 (of FIG. 3B), the electric scooter 314 (of FIG. 3C), the electric skateboard (of FIG. 3D), the upright human transportation vehicle 318 (of FIG. 3E), or the like, that use a Level 1 outlet, such as plug outlet 125 of outlet 120, can be simultaneously charged with the electric vehicle 305, which uses a Level 2 charge handle 114, and simultaneously charged with the battery bank 405, which uses a Level 1 outlet, such as plug outlet 130 of outlet 120. It will be understood that two or more Level 1 plug outlets (e.g., 125 and 130) can be used to charge two or more corresponding battery banks (e.g., 405) and/or Level 1 compatible electric vehicles (e.g., 310, 312, 314, 316, and 318), while the mixed-level EVSE unit 100 simultaneously can use a Level 2 charge handle 114 to charge a Level 2 compatible electric vehicle (e.g., 305).

Figure 5:
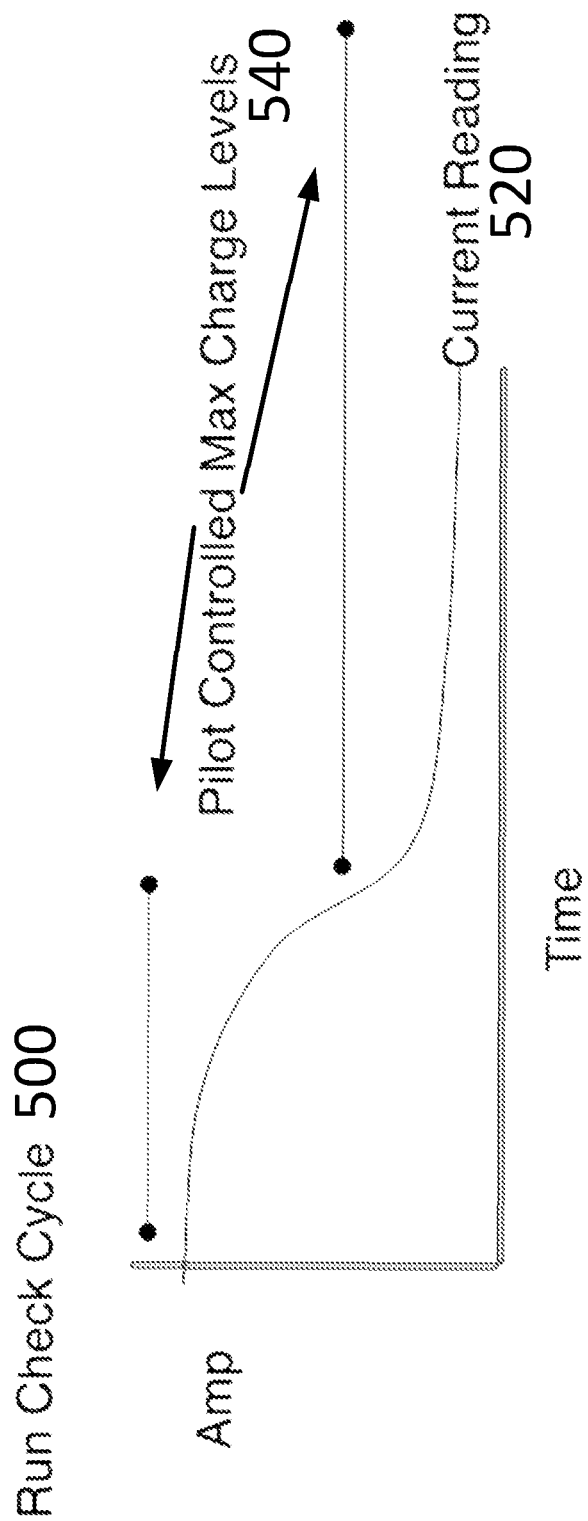
FIG. 5 illustrates a graph demonstrating the regulation of the electric vehicle charging in accordance with embodiments of the present invention.

FIG. 5 illustrates a graph demonstrating the regulation of the electric vehicle charging in accordance with embodiments of the present invention. The graph shows a run check cycle 500. The current reading 520 from the one or more current sensors (e.g., 118 of FIG. 1A) can be used to regulate the charging through the charge handle 114 (of FIG. 1A) and/or the outlet 120 (of FIGS. 1A and 2A) to a lower maximum without inhibiting a charge time or charging cycle. As shown in this example, there can be two pilot-controlled maximum charge levels 540, which represent two different maximum charge levels 540 for two different times. In other words, as the charging of the electric vehicle and/or other non-electric vehicle device progresses along the current reading curve 520, the pilot signal controlled max charge level 540 can be progressively lowered. In some embodiments, the pilot signal controlled max charge level 540 can be incrementally lowered as the charging of the electric vehicle and/or other non-electric vehicle devices (such as the battery bank 405 of FIG. 4) progresses. Alternatively, the pilot signal controlled max charge level 540 can be continuously lowered as the charging of the electric vehicle and/or other non-electric vehicle device progresses.

The charging logic and relay section 155 (of FIGS. 1B and 2B) can control the pilot signal-controlled max charge level over time for each electric vehicle and/or other device being charged. In some embodiments, the charging logic and relay section 155 (of FIGS. 1B and 2B) can individually control a separate pilot signal-controlled max charge level for each of the different electric vehicles and/or other devices being charged. In other words, as each electric vehicle and/or other non-electric vehicle device coupled to the mixed-level EVSE unit 100 follows its own current reading curve 520, the charging logic and relay section 155 (of FIGS. 1B and 2B) can individually lower the pilot signal controlled max charge level 540 for that particular electric vehicle and/or non-electric vehicle device. Alternatively or in addition, the charging logic and relay section 155 (of FIGS. 1B and 2B) can, over a charging time period, lower a global pilot signal controlled max charge level 540 for all connected electric vehicles and/or non-electric vehicle devices.

Figure 6:
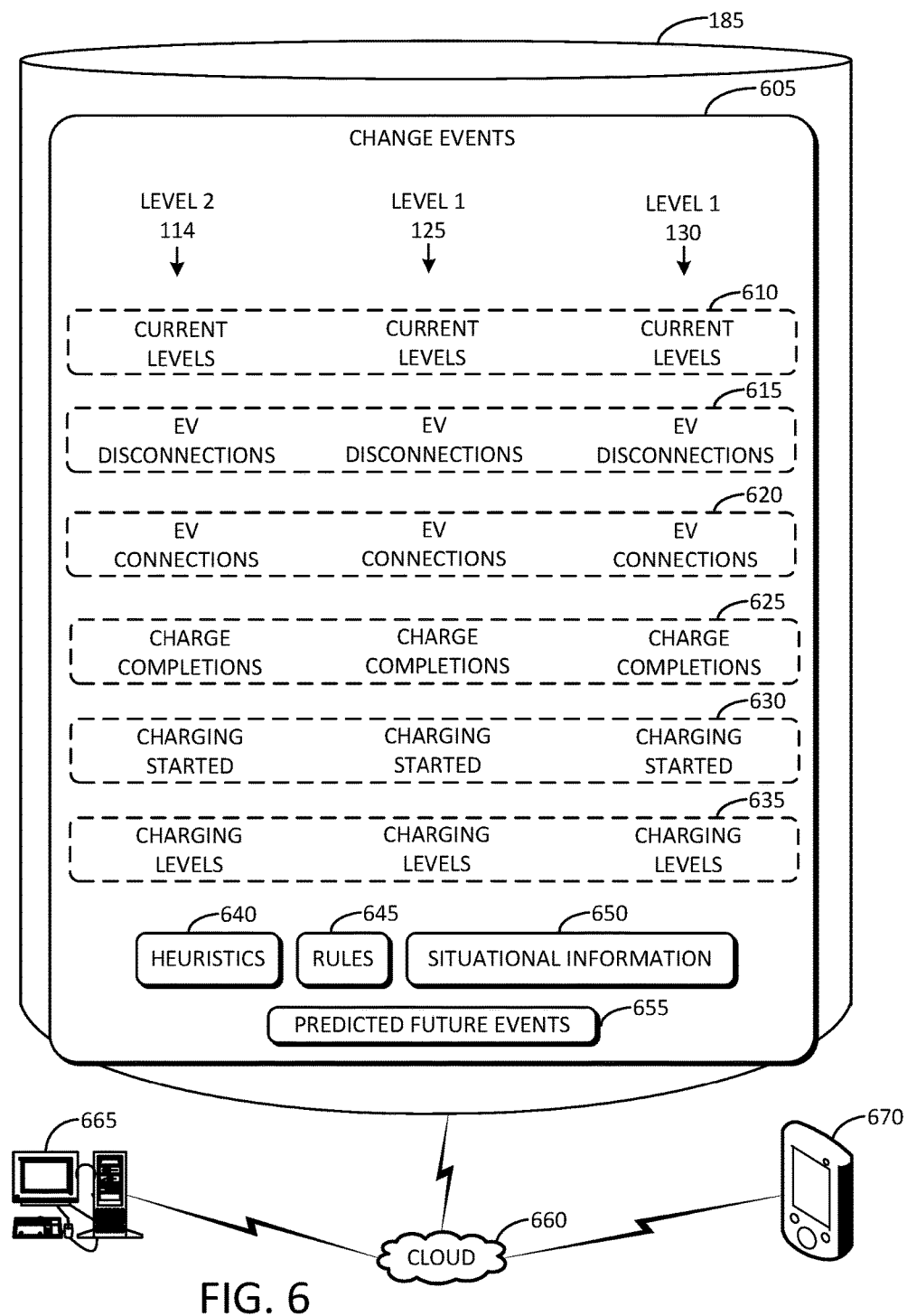
FIG. 6 illustrates a storage device and associated stored information in connection with the mixed-level EVSE unit of FIG. 1B and the single-level EVSE unit of FIG. 2B.

FIG. 6 illustrates a storage device 185 and associated stored information in connection with the mixed-level EVSE unit 100 of FIG. 1B and the single-level EVSE unit 200 of FIG. 2B. Reference is now made to FIGS. 1 through 6.

The charging logic and relay section 155 (e.g., of FIGS. 1B and 2B) can record and/or log, in the storage device 185, system change events 605. The system change events 605 can be associated with a Level 2 handle 114, a first Level 1 outlet 125, and/or a second Level 1 outlet 130. For example, the system change events 605 can be categorized and stored based on whether each system change event 605 is associated with the Level 2 handle 114, the first Level 1 outlet 125, and/or the second Level 1 outlet 130. The system change events 605 can be associated with individual electric vehicles or non-electric vehicle devices. The system change events 605 can include current levels 610 of charging, electric vehicle disconnections 615, electric vehicle connections 620, charge completions 625, charging started events 630, charging levels 635, or the like. The system change events 605 can be stored in the storage device 185 of the mixed-level EVSE unit 100.

The change events 605 can include a current level 610 of charging event for a particular Level 1 and/or 2 compatible electric vehicle and/or non-electric vehicle device. The change events 605 can include an electric vehicle disconnection event 615 from a particular EVSE unit 100, and for a particular Level 1 and/or 2 compatible electric vehicle and/or non-electric vehicle device. The change events 605 can include an electric vehicle connection event 620 to a particular mixed-level EVSE unit from among multiple mixed-level EVSE units, and for a particular Level 1 and/or 2 compatible electric vehicle and/or non-electric vehicle device. The change events 605 can include a charge completion event 625 for a particular Level 1 and/or 2 compatible electric vehicle and/or non-electric vehicle devices. The change events 605 can include a charging started event 630 for a particular Level 1 and/or 2 compatible electric vehicle and/or non-electric vehicle devices. The change events 605 can include a charging levels event 635 for a particular Level 1 and/or 2 compatible electric vehicle and/or non-electric vehicle devices.

The system change events 605 can be associated with time and stored as a history of events, which can be used to generate predicted future events 655 based on a set of heuristics 640, charging rules 645, situational information 650, or any combination thereof. In some embodiments, the history of events 605 for each charge handle and/or plug outlet can be stored on the corresponding mixed-level EVSE unit 100. In some embodiments, the history of events 605 for a particular charge handle and/or plug outlet can be stored only for the particular mixed-level EVSE unit 100.

The mixed-level EVSE unit 100 and the single-level EVSE unit 200 can each include a learning logic section 195 (of FIGS. 1B and 2B) to learn from the history of change events 605, and generate predicted future events 655 (e.g., future charging behavior, charging needs, or the like) of Level 1 and/or 2 compatible electric vehicles and/or non-electric vehicle devices, based on the history of change events 605. The learning logic section 195 can formulate or refine the heuristics 640, the charging rules 645, and/or the situational information 650. The mixed-level EVSE unit 100 can track individual Level 1 and/or 2 compatible vehicles and/or non-electric vehicle devices using an identifier, such as a radio frequency ID (RFID) tag and/or a near-field communication (NFC) tag (e.g., 315, 320, 322, 324, 326, and 328). The mixed-level EVSE unit 100 and the single-level EVSE unit 200 can each track the individual electric vehicles and/or non-electric vehicle devices via the tags.

The mixed-level EVSE unit 100 and the single-level EVSE unit 200 can access the stored history of change events 605 and apply the heuristics 640, the charging rules 645, the situational information 650, or combination thereof, to predict how much charge a particular Level 1 and/or 2 compatible electric vehicle or non-electric vehicle device will need at a particular time of day, and/or based on a particular day. Charging can be prioritized based on a user's usual arrival time, connection time, charging time, disconnection time, and/or time of leaving. The mixed-level EVSE unit 100 and the single-level EVSE unit 200 can each allocate among itself the available power for each Level 1 and/or 2 electric vehicle and/or non-electric vehicle device based at least on immediate demand. The mixed-level EVSE unit 100 and single-level EVSE unit 200 can each allocate among itself the available power for each Level 1 and/or 2 electric vehicle and/or non-electric vehicle device based at least on the heuristics 640, the charging rules 645, the situational information 650, or any combination thereof. The EVSE unit 100 and the EVSE unit 200 can each provide a predictive readout of total charge time (e.g., current draw, charge length, position in queue, and the like) based at least on the heuristics 640, the charging rules 645, the situational information 650, or any combination thereof.

The mixed-level EVSE unit 100 and EVSE unit 200 can each reconfigure the level of charge provided to each Level 1 and/or 2 compatible electric vehicle and/or non-electric vehicle device based on the total power available for a given circuit, or based on the total power available for the mixed-level EVSE unit 100 or EVSE unit 200, as the case may be. Because reconfiguring is an expensive operation in terms of time and/or electric vehicle charging protocol limitations, the amount of reconfiguring needed can be reduced by relying on the predictive heuristics 640, the charging rules 645, the situational information 650, or any combination thereof.

For example, if a particular Level 1 and/or 2 compatible electric vehicle is known to only trickle charge at a particular time of day, then a trickle charge can be applied from the start, i.e., at the time the electric vehicle plugs in and requests a charge. By way of another example, the mixed-level EVSE unit 100 might determine that at 2 PM on weekdays a particular Level 1 and/or 2 compatible electric vehicle and/or non-electric vehicle device will need a full charge. By way of yet another example, just because a particular Level 1 and/or 2 compatible electric vehicle and/or non-electric vehicle device is first to plug into a given mixed-level EVSE unit 100 associated with a given circuit, that does not necessarily mean that that particular Level 1 and/or 2 compatible electric vehicle and/or non-electric vehicle device receives a full or maximum charging power level, but rather, based on the heuristics 640, the charging rules 645, and/or the situational information 650, that particular Level 1 and/or 2 compatible electric vehicle and/or non-electric vehicle device may receive from the start a reduced level of charging power. By way of another example, the heuristics 640, the charging rules 645, and/or the situational information 650 may indicate that a Level 2 compatible electric vehicle should receive a greater allocation of power or charge than a Level 1 compatible electric vehicle or non-electric vehicle device. By way of yet another example, the heuristics 640, the charging rules 645, and/or the situational information 650 may indicate that a Level 1 compatible electric vehicle or non-electric vehicle device should receive a greater allocation of power or charge than a Level 2 compatible electric vehicle.

The mixed-level EVSE unit 100 can determine where each Level 1 and/or 2 compatible electric vehicle and/or non-electric vehicle device is in the charging cycle and adjust current and/or power levels up or down, using for example, the pilot signal described above. The charging cycle data can be represented and stored on the storage device 185 of the mixed-level EVSE unit 100 as graphs, logs, change event lists, or the like. The mixed-level EVSE unit 100 can determine whether the current day is a weekday or a weekend day and adjust accordingly. The single-level EVSE unit 200 can perform similar functions for Level 1 electric vehicles and non-electric vehicle devices.

The heuristics 640, the charging rules 645, the situational information 650, or combination thereof, can also be used to determine safety buffers in the charging, and can take into account history and immediate needs. For example, the heuristics 640, the charging rules 645, and/or the situation information 650 can include information regarding the maximum installed power for a given location and the built-in buffer for adhering to government code. The mixed-level EVSE unit 100 can provide predictive information to electric vehicle owners, such as estimations of time of charge completion for a particular Level 1 and/or 2 compatible electric vehicle, charging rate, or the like.

Such information including the heuristics 640, the charging rules 645, the situational information 650, the graphs, the logs, the change event list 605, the predictive information (e.g., predicted future events 655), or the like, can be stored on the storage device 185 of the mixed-level EVSE unit 100 and/or in a database of a remote server 665 via the cloud 660. Electric vehicle owners can remotely access such information via a mobile device such as a smart phone (e.g., 670) or tablet. The single-level EVSE unit 200 can perform similar functions for Level 1 electric vehicles and non-electric vehicle devices.

The mixed-level EVSE unit 100 can determine when a particular Level 1 and/or 2 compatible electric vehicle and/or non-electric vehicle device requests and receives a charge. The mixed-level EVSE unit 100 can determine an amount of charge that is needed to complete the charge. The mixed-level EVSE unit 100 can analyze past charge currents or events. The mixed-level EVSE unit 100 can match the pilot signal to draw a current that is equal to a predictive current draw for a particular Level 1 and/or 2 compatible electric vehicle and/or non-electric vehicle device based on the heuristics 640, the charging rules 645, the situational information 650, or any combination thereof. In the event that an electric vehicle requests a "normal" maximum charging level, and the "normal" maximum charging level is unavailable due to circuit constraints, then the mixed-level EVSE unit 100 can use the heuristics 640, the charging rules 645, or the situational information 650 to determine a charging level that is less than the "normal" maximum charging level. The "less-than-normal" charging level can be a charge level that is less than the "normal" maximum charging level. For example, based on the heuristics 640, the charging rules 645, and/or the situational information 650, the mixed-level EVSE unit 100 can cause the less-than-normal charging level to be used to charge the particular Level 1 and/or 2 compatible electric vehicle and/or non-electric vehicle device. The single-level EVSE unit 200 can perform similar functions for Level 1 electric vehicles and non-electric vehicle devices.

Figure 7:
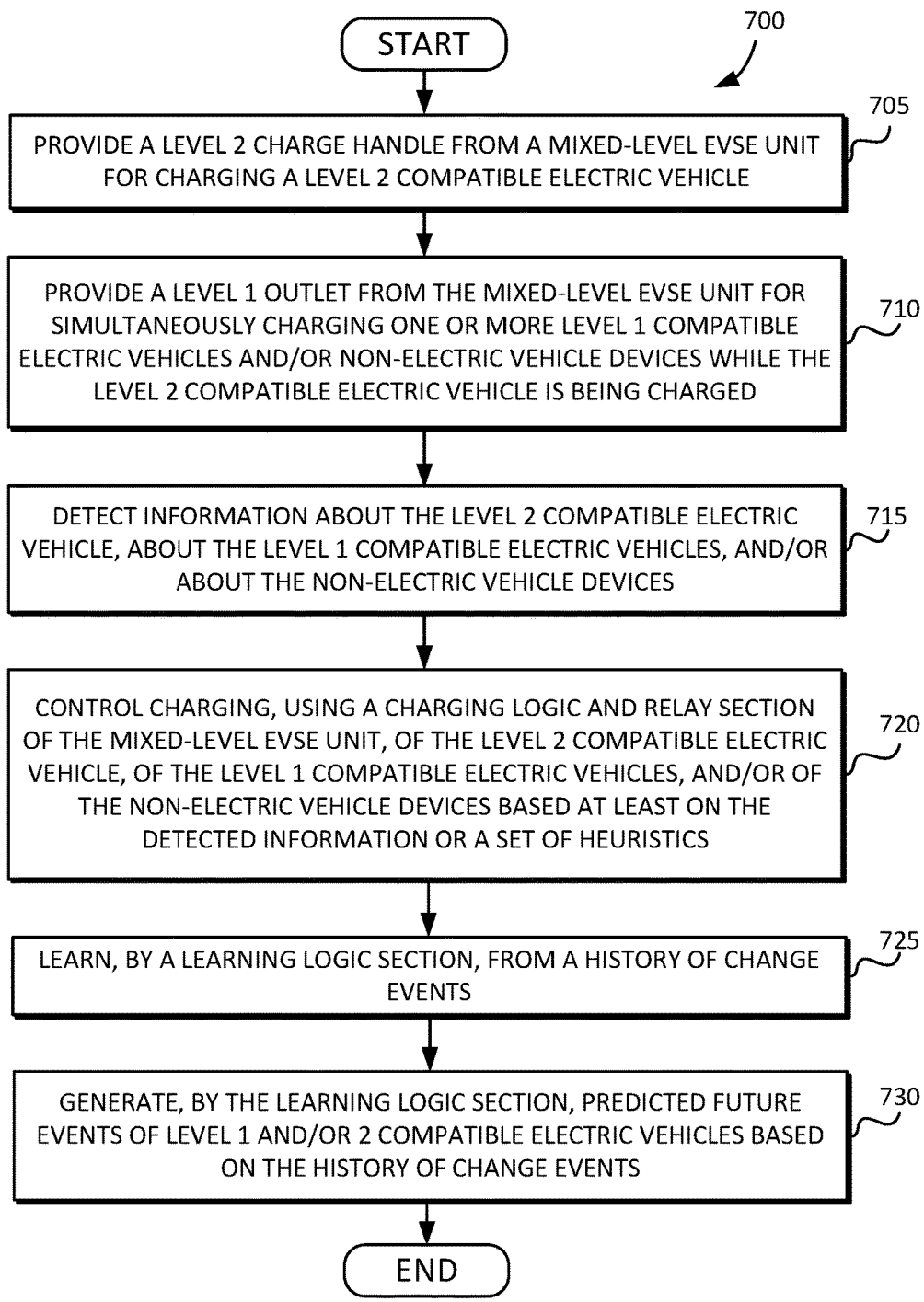
FIG. 7 shows a flow diagram illustrating a technique for controlling the simultaneous charging of Level 1 and/or Level 2 electric vehicles and/or non-electric vehicle devices from a single mixed-level EVSE unit in accordance with embodiments of the present invention.

FIG. 7 shows a flow diagram 700 illustrating a technique for controlling the simultaneous charging of Level 1 and/or Level 2 electric vehicles and/or non-electric vehicle devices from a single mixed-level EVSE unit (e.g., 100) in accordance with embodiments of the present invention. The technique can begin at 705, where a Level 2 charge handle can be provided from a mixed-level EVSE unit 100 for charging a Level 2 compatible electric vehicle. At 710, a Level 1 outlet can be provided from the mixed-level EVSE unit 100 for simultaneously charging one or more Level 1 compatible electric vehicles and/or non-electric vehicle devices while the Level 2 compatible electric vehicle is being charged. It will be understood that the Level 1 and/or 2 compatible electric vehicles and/or non-electric vehicle devices need not be charged simultaneously, but can also be charged sequentially or individually. In some embodiments, the Level 1 and/or 2 compatible electric vehicles and/or non-electric vehicle devices are charged simultaneously. At 715, information can be detected about the Level 2 compatible electric vehicle, about the Level 1 compatible electric vehicles, and/or about the non-electric vehicle devices. At 720, charging can be controlled, using a charging logic and relay section (e.g., 155) of the mixed-level EVSE unit 100. The charging can be controlled for the Level 2 compatible electric vehicle, the Level 1 compatible electric vehicles, and/or the non-electric vehicle devices based at least on the detected information or a set of heuristics 640, charging rules 645, situational information 650, or any combination thereof, as described in detail above. At 725, a learning logic section (e.g., 195 of FIG. 1B) can learn from a history of change events (e.g., 605 of FIG. 6). At 730, the learning logic section 195 can generate predicted future events (e.g., 655) based on the history of change events 605.

The single-level EVSE unit 200 can perform similar functions for Level 1 electric vehicles and non-electric vehicle devices. It will be understood that the steps illustrated in FIG. 7 need not be performed in the order shown, but rather, can be performed in a different order and/or with intervening steps.

In some embodiments, a multi-level electric vehicle supply equipment (EVSE) unit is provided. The multi-level EVSE unit can include a Level 2 charge handle, a receptacle configured to receive the Level 2 charge handle, and a Level 1 outlet including one or more plug outlets configured to receive one or more corresponding Level 1 plugs.

In some embodiments, the Level 2 charge handle is permanently attached to the multi-level EVSE unit via a cable. In some embodiments, the Level 1 outlet is configured to temporarily receive the one or more corresponding Level 1 plugs.

The multi-level EVSE unit can include a first power meter associated with the Level 2 charge handle, and configured to meter power delivered via the Level 2 charge handle, and a second power meter associated with the Level 1 outlet, and configured to meter power delivered via the Level 1 outlet.

The multi-level EVSE unit can include a power relay section electrically coupled to the second power meter and to the Level 1 outlet, and configured to enable or disable charging through the Level 1 outlet, and a charging logic and relay section communicatively coupled to the power relay section, and configured to cause the power relay section to enable or disable charging through the Level 1 outlet according to charging rules.

In some embodiments, the charging logic and relay section is communicatively coupled to the Level 2 charge handle via a communication line, and configured to cause charging through the Level 2 handle to be enabled or disabled according to the charging rules. In some embodiments, the charging logic and relay section is configured to intelligently allocate power between the Level 2 handle and the Level 1 outlet according to the charging rules.

The multi-level EVSE unit can include a storage device configured to store a history of change events, and a learning logic section coupled to the charging logic and relay section, and configured to learn from the history of change events, and to generate predicted future events based on the history of change events.

In some embodiments, the storage device is configured to store a first history of change events associated with the Level 2 charge handle. In some embodiments, the storage device is configured to store a second history of change events associated with the Level 1 outlet.

In some embodiments, the learning logic section is configured to learn from the first history of change events associated with the Level 2 charge handle, and to generate first predicted future events based on the first history of change events. In some embodiments, the learning logic section is configured to learn from the second history of change events associated with the Level 1 outlet, and to generate second predicted future events based on the second history of change events. In some embodiments, the charging logic and relay section is configured to intelligently allocate power between the Level 2 handle and the Level 1 outlet according to the first predicted future events, the second predicted future events, and the charging rules.

In some embodiments, the change events include at least one of a current level event, an electric vehicle disconnection event, an electric vehicle connection event, a charge completion event, a charging started event, or a charging level event.

The multi-level EVSE unit can include a current sensor. In some embodiments, the charging logic and relay section is configured to control a pilot signal max charge level over a period of time in which an electric vehicle is charged via the Level 2 charge handle based on a current reading from the current sensor. In some embodiments, the charging logic and relay section is configured to gradually decrease the pilot signal max charge level over the period of time in which the electric vehicle is charged via the Level 2 charge handle based on the current reading from the current sensor.

In some embodiments, the Level 2 charge handle is configured to be coupled with a first electric vehicle to charge the first electric vehicle. In some embodiments, the Level 1 outlet is configured to receive a first Level 1 plug associated with a second electric vehicle, and to charge the second electric vehicle. In some embodiments, the Level 1 outlet is configured to receive a second Level 1 plug associated with a non-electric vehicle device, and to charge the non-electric vehicle device. In some embodiments, the multi-level EVSE unit further comprises a radio frequency identification (RFID) reader. In some embodiments, the first electric vehicle includes a first RFID tag. In some embodiments, the second electric vehicle includes a second RFID tag. In some embodiments, the non-electric vehicle device includes a third RFID tag. In some embodiments, the RFID reader is configured to detect first information from the first RFID tag about the first electric vehicle. In some embodiments, the RFID reader is configured to detect second information from the second RFID tag about the second electric vehicle. In some embodiments, the RFID reader is configured to detect third information from the third RFID tag about the non-electric vehicle device. In some embodiments, the charging logic and relay section is configured to make charging determinations based at least on the first detected information, the second detected information, and the third detected information.

In some embodiments, the first electric vehicle is at least one of an electric car, an electric van, an electric bus, or an electric truck. In some embodiments, the second electric vehicle is at least one of an electric golf cart, an electric bike, an electric scooter, an electric skateboard, or an electric upright human transportation vehicle. In some embodiments, the non-electric vehicle device is a battery bank.

In some embodiments, the receptacle is referred to as a first receptacle, the communication line is referred to as a first communication line, and the cable is referred to as a first cable. The multi-level EVSE unit can further include a Level 3 charge handle, and a second receptacle configured to receive the Level 3 charge handle. In some embodiments, the Level 3 charge handle is permanently attached to the multi-level EVSE unit via a second cable. In some embodiments, the charging logic and relay section is communicatively coupled to the Level 3 charge handle via a second communication line, and configured to cause charging through the Level 3 handle to be enabled or disabled according to the charging rules.

Embodiments can include a method for charging mixed-level electric vehicle and non-electric vehicle devices. The method can include providing a Level 2 charge handle from a mixed-level electric vehicle supply equipment (EVSE) unit, charging a Level 2 compatible electric vehicle, providing a Level 1 outlet from the mixed-level EVSE unit, and simultaneously charging one or more Level 1 compatible electric vehicles or non-electric vehicle devices while the Level 2 compatible electric vehicle is being charged.

The method can further include detecting first information about the Level 2 compatible electric vehicle, detecting second information about the one or more Level 1 compatible electric vehicles or non-electric vehicle devices, controlling charging, by a charging logic and relay section of the mixed-level EVSE unit, of the Level 2 compatible electric vehicle, and controlling charging, by the charging logic and relay section of the mixed-level EVSE unit, of the one or more Level 1 compatible electric vehicles or non-electric vehicle devices.

The method can further include storing, by a storage device, a first history of change events associated with the Level 2 compatible electric vehicle. The method can further include storing, by the storage device, a second history of change events associated with the one or more Level 1 compatible electric vehicles or non-electric vehicle devices.

The method can further include learning, by a learning logic section, from the first history of change events associated with the Level 2 compatible electric vehicle. The method can further include generating, by the learning logic section, first predicted future events based on the first history of change events. The method can further include learning, by the learning logic section, from the second history of change events associated with the one or more Level 1 compatible electric vehicles or non-electric vehicle devices. The method can further include generating, by the learning logic section, second predicted future events based on the second history of change events. The method can further include intelligently allocating power, by the charging logic and relay section, between the Level 2 compatible electric vehicle and the one or more Level 1 compatible electric vehicles or non-electric vehicle devices according to the first predicted future events, the second predicted future events, and charging rules.

In some embodiments, the Level 2 compatible electric vehicle is at least one of a Level 2 compatible electric car, a Level 2 compatible electric van, a Level 2 compatible electric bus, or a Level 2 compatible electric truck. In some embodiments, the one or more Level 1 compatible electric vehicles includes at least one of a Level 1 compatible electric golf cart, a Level 1 compatible electric bike, a Level 1 compatible electric scooter, a Level 1 compatible electric skateboard, or a Level 1 compatible electric upright human transportation vehicle.

The following discussion is intended to provide a brief, general description of a suitable machine or machines in which certain aspects of the invention can be implemented. Typically, the machine or machines include a system bus to which is attached processors, memory, e.g., random access memory (RAM), read-only memory (ROM), or other state preserving medium, storage devices and units, a video interface, and input/output interface ports. The machine or machines can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines can include embedded controllers, such as programmable or non-programmable logic devices or arrays, Application Specific Integrated Circuits (ASICs), embedded computers, smart cards, and the like. The machine or machines can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth®, optical, infrared, cable, laser, etc.

Embodiments of the invention can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the invention with reference to illustrated embodiments, it will be recognized that the illustrated embodiments can be modified in arrangement and detail without departing from such principles, and can be combined in any desired manner. And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms can reference the same or different embodiments that are combinable into other embodiments.

Embodiments of the invention may include a non-transitory machine-readable medium comprising instructions executable by one or more processors, the instructions comprising instructions to perform the elements of the inventive concepts as described herein.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

The invention claimed is:

1. A multi-level electric vehicle supply equipment (EVSE) unit, comprising:
   a Level 2 charge handle;
   a receptacle configured to receive the Level 2 charge handle;
   a Level 1 outlet including one or more plug outlets configured to receive one or more corresponding Level 1 plugs;
   a first power meter associated with the Level 2 charge handle, and configured to meter power delivered via the Level 2 charge handle;
   a second power meter associated with the Level 1 outlet, and configured to meter power delivered via the Level 1 outlet;
   a power relay section electrically coupled to the second power meter and to the Level 1 outlet, and configured to enable or disable charging through the Level 1 outlet;
   a charging logic and relay section communicatively coupled to the power relay section, and configured to cause the power relay section to enable or disable charging through the Level 1 outlet according to charging rules; and
   a current sensor, wherein the charging logic and relay section is configured to control a pilot signal max charge level over a period of time in which an electric vehicle is charged via the Level 2 charge handle based on a current reading from the current sensor, wherein the charging logic and relay section is configured to gradually decrease the pilot signal max charge level over the period of time in which the electric vehicle is charged via the Level 2 charge handle based on the current reading from the current sensor.

2. The multi-level EVSE unit of claim 1, wherein:

the Level 2 charge handle is permanently attached to the multi-level EVSE unit via a cable; and the Level 1 outlet is configured to temporarily receive the one or more corresponding Level 1 plugs.

3. The multi-level EVSE unit of claim 1, wherein the charging logic and relay section is communicatively coupled to the Level 2 charge handle via a communication line, and configured to cause charging through the Level 2 handle to be enabled or disabled according to the charging rules.

4. The multi-level EVSE unit of claim 1, wherein the charging logic and relay section is configured to intelligently allocate power between the Level 2 handle and the Level 1 outlet according to the charging rules.

5. The multi-level EVSE unit of claim 1, further comprising:

a storage device configured to store a history of change events; and a learning logic section coupled to the charging logic and relay section, and configured to learn from the history of change events, and to generate predicted future events based on the history of change events.

6. The multi-level EVSE unit of claim 5, wherein:

the storage device is configured to store a first history of change events associated with the Level 2 charge handle; and the storage device is configured to store a second history of change events associated with the Level 1 outlet.

7. The multi-level EVSE unit of claim 6, wherein:

the learning logic section is configured to learn from the first history of change events associated with the Level 2 charge handle, and to generate first predicted future events based on the first history of change events;

the learning logic section is configured to learn from the second history of change events associated with the Level 1 outlet, and to generate second predicted future events based on the second history of change events; and the charging logic and relay section is configured to intelligently allocate power between the Level 2 handle and the Level 1 outlet according to the first predicted future events, the second predicted future events, and the charging rules.

8. The multi-level EVSE unit of claim 5, wherein the change events include at least one of a current level event, an electric vehicle disconnection event, an electric vehicle connection event, a charge completion event, a charging started event, or a charging level event.

9. A multi-level electric vehicle supply equipment (EVSE) unit, comprising:

a Level 2 charge handle;

a receptacle configured to receive the Level 2 charge handle;

a Level 1 outlet including one or more plug outlets configured to receive one or more corresponding Level 1 plugs, wherein:

the Level 2 charge handle is permanently attached to the multi-level EVSE unit via a cable;

the Level 1 outlet is configured to temporarily receive the one or more corresponding Level 1 plugs;

the Level 2 charge handle is configured to be coupled with a first electric vehicle to charge the first electric vehicle;

the Level 1 outlet is configured to receive a first Level 1 plug associated with a second electric vehicle, and to charge the second electric vehicle;

the Level 1 outlet is configured to receive a second Level 1 plug associated with a non-electric vehicle device, and to charge the non-electric vehicle device;

the multi-level EVSE unit further comprises a radio frequency identification (RFID) reader;

the first electric vehicle includes a first RFID tag;

the second electric vehicle includes a second RFID tag;

the non-electric vehicle device includes a third RFID tag;

the RFID reader is configured to detect first information from the first RFID tag about the first electric vehicle;

the RFID reader is configured to detect second information from the second RFID tag about the second electric vehicle;

the RFID reader is configured to detect third information from the third RFID tag about the non-electric vehicle device; and the charging logic and relay section is configured to make charging determinations based at least on the first detected information, the second detected information, and the third detected information.

10. The multi-level EVSE unit of claim 9, wherein:

the first electric vehicle is at least one of an electric car, an electric van, an electric bus, or an electric truck;

the second electric vehicle is at least one of an electric golf cart, an electric bike, an electric scooter, an electric skateboard, or an electric upright human transportation vehicle; and the non-electric vehicle device is a battery bank.

11. A multi-level electric vehicle supply equipment (EVSE) unit, comprising:

a Level 2 charge handle;

a receptacle configured to receive the Level 2 charge handle; and a Level 1 outlet including one or more plug outlets configured to receive one or more corresponding Level 1 plugs, wherein the receptacle is referred to as a first receptacle, the communication line is referred to as a first communication line, and the cable is referred to as a first cable, the multi-level EVSE unit further comprising:

a Level 3 charge handle;

a second receptacle configured to receive the Level 3 charge handle, wherein the Level 3 charge handle is permanently attached to the multi-level EVSE unit via a second cable, wherein the charging logic and relay section is communicatively coupled to the Level 3 charge handle via a second communication line, and configured to cause charging through the Level 3 handle to be enabled or disabled according to the charging rules.

12. A method for charging mixed-level electric vehicle and non-electric vehicle devices, the method comprising:

providing a Level 2 charge handle from a mixed-level electric vehicle supply equipment (EVSE) unit;

charging a Level 2 compatible electric vehicle;

providing a Level 1 outlet from the mixed-level EVSE unit;

simultaneously charging one or more Level 1 compatible electric vehicles or non-electric vehicle devices while the Level 2 compatible electric vehicle is being charged;

detecting first information about the Level 2 compatible electric vehicle;

detecting second information about the one or more Level 1 compatible electric vehicles or non-electric vehicle devices;

controlling charging, by a charging logic and relay section of the mixed-level EVSE unit, of the Level 2 compatible electric vehicle;

controlling charging, by the charging logic and relay section of the mixed-level EVSE unit, of the one or more Level 1 compatible electric vehicles or non-electric vehicle devices;

storing, by a storage device, a first history of change events associated with the Level 2 compatible electric vehicle;

storing, by the storage device, a second history of change events associated with the one or more Level 1 compatible electric vehicles or non-electric vehicle devices;

learning, by a learning logic section, from the first history of change events associated with the Level 2 compatible electric vehicle;

generating, by the learning logic section, first predicted future events based on the first history of change events;

learning, by the learning logic section, from the second history of change events associated with the one or more Level 1 compatible electric vehicles or non-electric vehicle devices;

generating, by the learning logic section, second predicted future events based on the second history of change events; and intelligently allocating power, by the charging logic and relay section, between the Level 2 compatible electric vehicle and the one or more Level 1 compatible electric vehicles or non-electric vehicle devices according to the first predicted future events, the second predicted future events, and charging rules.

13. The method of claim 12, wherein the change events include at least one of a current level event, an electric vehicle disconnection event, an electric vehicle connection event, a charge completion event, a charging started event, or a charging level event.

14. The method of claim 12, wherein:

the Level 2 compatible electric vehicle is at least one of a Level 2 compatible electric car, a Level 2 compatible electric van, a Level 2 compatible electric bus, or a Level 2 compatible electric truck; and the one or more Level 1 compatible electric vehicles includes at least one of a Level 1 compatible electric golf cart, a Level 1 compatible electric bike, a Level 1 compatible electric scooter, a Level 1 compatible electric skateboard, or a Level 1 compatible electric upright human transportation vehicle.

* * * * *